Nov. 13, 1962  O. M. TOENNIES  3,063,383
BACK-SWITCHING ELIMINATORS FOR MONORAIL CONVEYORS
Filed Feb. 2, 1960  2 Sheets-Sheet 1
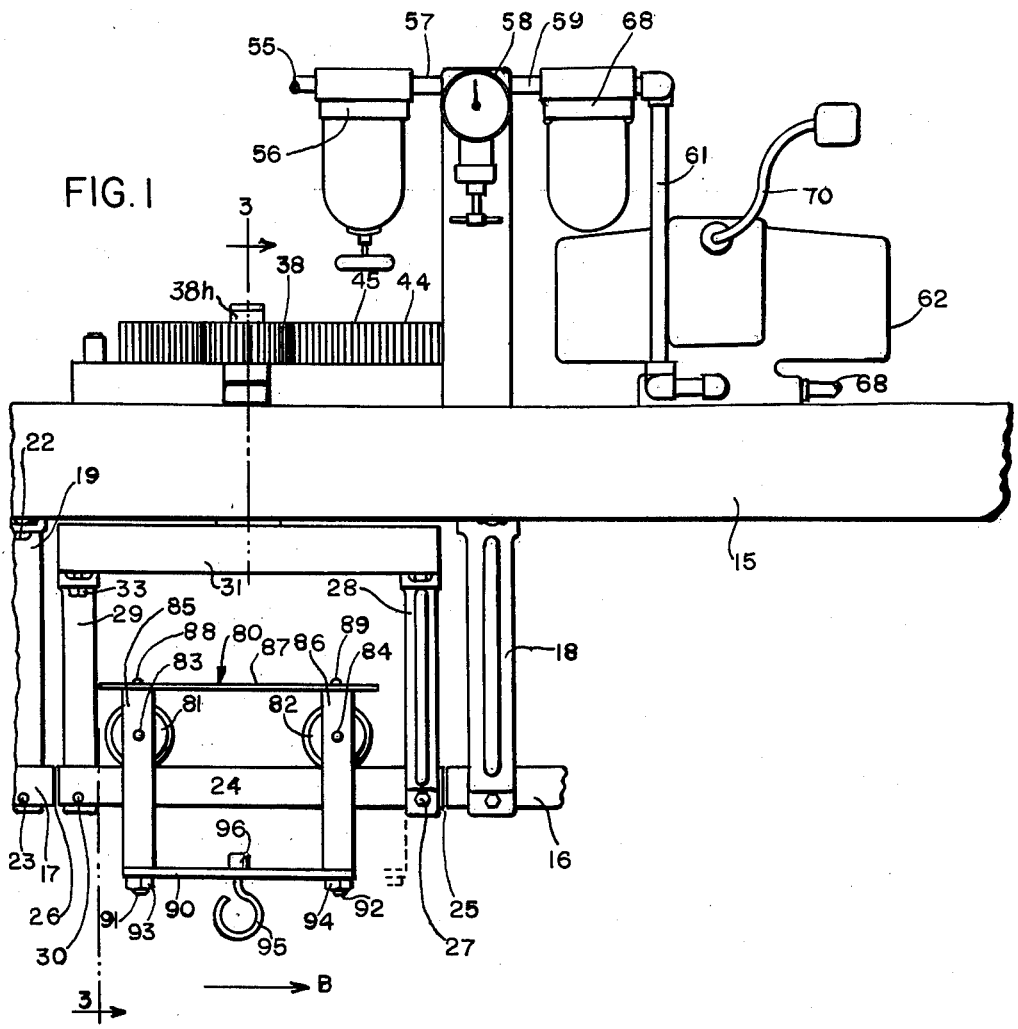
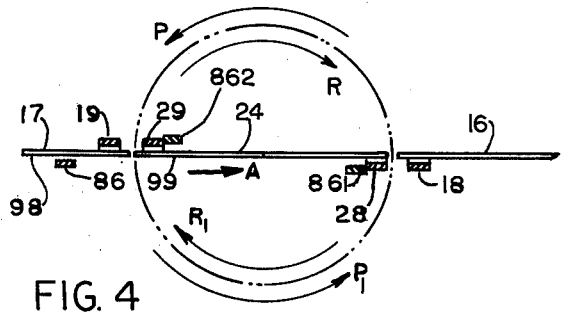
INVENTOR.
OWE M. TOENNIES
BY Pearce & Schaepenklaus
ATTORNEYS Nov. 13, 1962    O. M. TOENNIES    3,063,383
BACK-SWITCHING ELIMINATORS FOR MONORAIL CONVEYORS
Filed Feb. 2, 1960    2 Sheets-Sheet 2
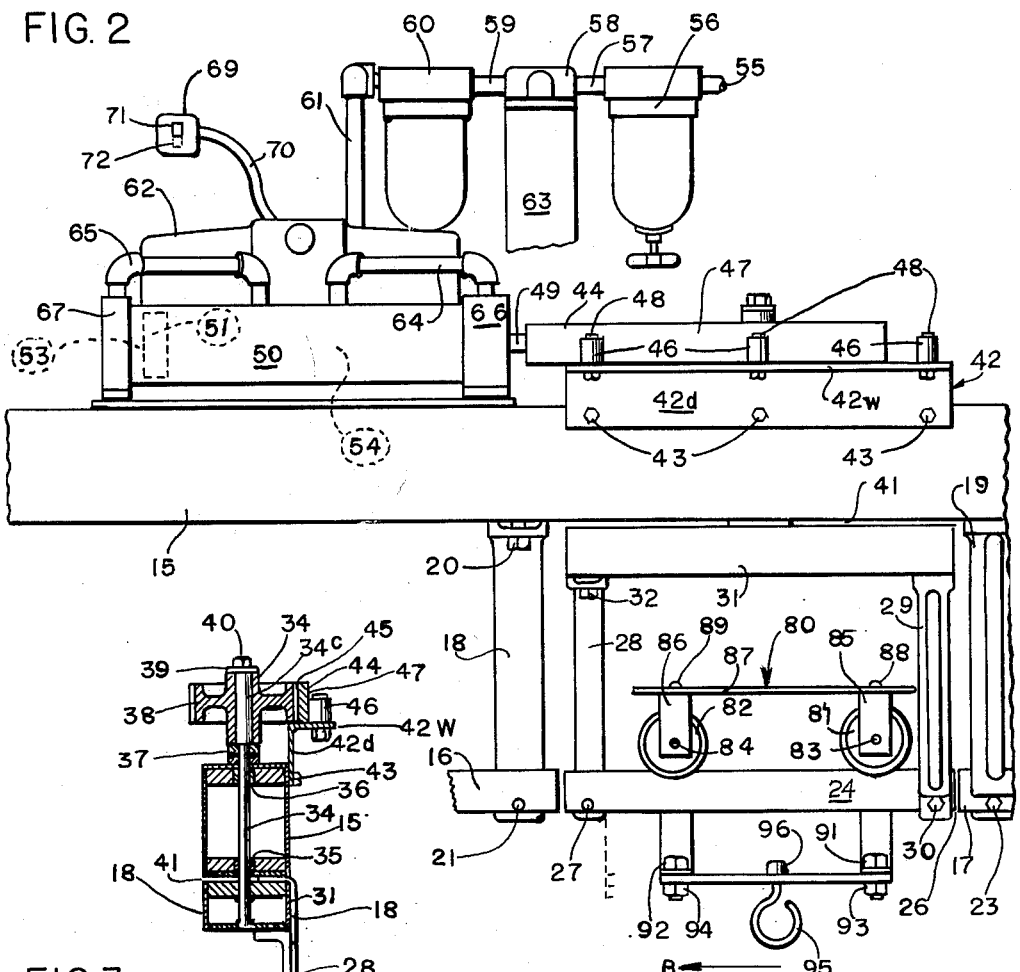
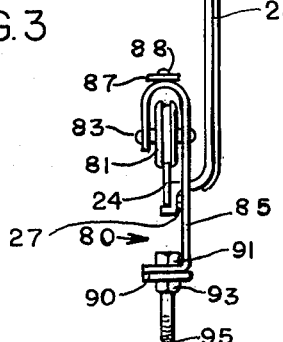
INVENTOR.
OWE M. TOENNIES
BY Pearce and Schaeperklaus
ATTORNEYS

United States Patent Office 3,063,383
Patented Nov. 13, 1962

3,063,383
BACK-SWITCHING ELIMINATORS FOR MONORAIL CONVEYORS
Owe M. Toennies, Cincinnati, Ohio, assignor to The Grove Research and Development Co., Cincinnati, Ohio, a corporation of Ohio
Filed Feb. 2, 1960, Ser. No. 6,225
8 Claims. (Cl. 104—99)

This invention relates to back-switching eliminators for monorail conveyors used in packing houses and the like.

An object of this invention is to provide means for eliminating the need for back-switching of units conveyed upon a monorail conveyor, back-switching being the term used in business establishments such as meat packing houses, to denote the movement of a unit from a first line over a connecting switch onto a second line of a conveyor system in one direction, stopping the unit and then advancing it in the reverse direction along the second line, including passage over the switch which has in the interim been thrown.

Another object is to reduce the amount of labor and time required to move meat and meat products by monorail conveyor from place to place in a packing house.

Another object of this invention is to provide a simple, thoroughly reliable device, the use of which eliminates back-switching of conveyed units.

A further object is to provide in a monorail conveyor three sections in tandem alignment, the first section supported in fixed position from one side, the second section supported in fixed position from an opposite side, and a third section supported in alignment with and between said first and second sections, said third section being supported adjacent each of its ends from a respective opposite side which is the same side as that from which the adjacent fixedly supported section is supported, said third section being supported for rotation about an axis normal to said monorail, means for rotating said third section through a predetermined angle into limit positions of alignment with said first and second sections.

A further object of this invention is to provide a device of the foregoing character in which said means for rotating said third section comprises power means for reciprocating a rack in engagement with a pinion gear secured for rotation in unison with said third section, said reciprocation being within predetermined precise limits.

A further object of this invention is to provide a device of the foregoing character in which conveyances adapted for movement along said monorail comprise a trolley portion and a load-supporting portion depending therefrom and rotatable relative thereto about an axis adjacent the axis of rotation of said third section when said trolley has been advanced into a position predetermined by cooperation between said trolley and trolley indexing means support in relation to said third section.

The above and other objects and features of this invention will in part be obvious and in part apparent to those having ordinary skill in the art to which this invention pertains.

In the following specification and accompanying drawings, like reference characters indicate like parts.

In the drawings:

FIG. 1 is a view in side elevation of a back-switching eliminator embodying my invention;

FIG. 2 is a view in side elevation of the structure shown in FIG. 1 when viewed from the opposite side, and FIG. 3 is a view in vertical section taken along the line 3—3 of FIG. 1.

FIG. 4 is a somewhat schematic fragmentary view of sections of monorail with associated fragments of supports therefor also shown in other views of the drawings.

The embodiment of my invention illustrated in the drawings has a box section frame 15 beneath which monorail sections 16 and 17 are supported in fixed relation by a plurality of hanger brackets 18 and 19, respectively. Brackets 18 are secured by bolts 20 (FIG. 2) to frame 15 and by bolts 21 to monorail section 16. Similarly, brackets 19 are secured by bolts 22 (FIG. 1) to frame 15 and by bolts 23 to monorail section 17. Monorail section 24 is supported between and in alignment with sections 16 and 17 from which it is separated by small clearance gaps 25 and 26. Section or segment 24 is secured by a bolt 27 with its one side face in abutment with hanger bracket 28 and by bolt 30 with its opposite side face in abutment with hanger bracket 29. Hanger brackets 28 and 29 are respectively secured to double crank frame 31 by bolts 32 and 33. Double crank frame 31 is secured in integral relation to stub shaft 34 which extends upwardly from frame 31 through radial sleeve bearings 35, 36, thrust bearing 37, pinion gear 38, and into cooperative relation to collar 39 and nut 40. Bearing sleeves 35, 36 are supported in vertical axial alignment in the frame 15. Pinion gear 38 is secured to shaft 34 adjacent its upper end by means of keys or splines 34c, for rotation in unison therewith. Collar 39, by nut 40 in threaded cooperation with shaft 34, is secured against shifting longitudinally of shaft 34 so as to rest upon the upper end of hub 38h of gear 38. The lower end of hub 38h rests in cooperative engagement upon thrust bearing 37 supported upon frame 15. Stub shaft 34 is of a length which will result in a clearance gap 41 between frame 15 and double crank frame 31. Thus, pinion gear 38, stub shaft 34, double crank frame 31, hanger brackets 28, 29 and monorail section 24 are secured together to form a rigid unitary structure supported for rotation about a vertical axis by bearings 35, 36, and 37.

Flange 42d of angle bracket 42 is secured by bolts 43 to frame 15 and flange 42w thereof provides a flat surface or way for rack 44. The teeth 45 of rack 44 are adapted for engagement with the teeth of pinion gear 38. Rack guide rollers 46 are journaled for rotation on stub shafts 48 adjustably secured to flange 42w so as to be adjustable into positions in which they will cooperate with face 47 of rack 44 and thus guide rack 44 along a path in which its teeth 45 cooperate with the teeth of pinion gear 38. Rack 44 may, as shown, be integrally joined to a piston rod portion 49. A cylinder 50 in fluid sealed cooperation with piston rod portion 49 contains a piston 51 secured to piston rod portion 49 and reciprocable therewith. Piston 51 serves to divide the bore of cylinder 50 into two chambers 53, 54 respectively, enclosed in part by heads 66 and 67. Compressed air supply line 55 is connected to the inlet of air cleaner 56 to supply compressed air from a suitable source. Air cleaner 56, pipe 57, adjustable pressure regulator 58, pipe 59, oiler 60 and pipe line 61, are connected in series and supply clean compressed oil bearing air, under pressure less than or equal to the pressure in air line 55, to the inlet port of solenoid actuated valve 62. As shown, the pressure regulator 58 and through it the associated structure, may be supported by a bracket 63.

Valve 62 has two ports which are respectively connected by pipelines 64, 65, to the heads 66, 67 of cylinder 50. Valve 62 is a solenoid actuated quick acting two position valve through which compressed air may be supplied to cylinder 50 through either pipeline 64 or 65, while the other of said pipelines 65 or 64 is vented to the atmosphere through exhaust pipeline 68 connected to the vent port of valve 62. Exhaust pipeline 68 may be of any desired length necessary to discharge air from the cylinder 50 at the location preferred.

The actuating solenoid of valve 62 is controlled by an electric switch such as toggle switch 69, which may be conveniently located and connected by cable 70 to the solenoid valve 62. Piston 51 and cylinder 50 cooperate to establish limits of movement of piston 51. Piston 51 is connected to piston rod 49 which in turn moves with rack 44, so that means limiting movement of piston 51 also serve to establish corresponding limits on linear movement of rack 44. As previously explained, valve 62 is a two-position valve and in one position hereinafter designated first position, will supply compressed air through pipe 64 and head 66 into cylinder chamber 54 to push piston 51 into the limit position adjacent head 67. While compressed air is so supplied to cylinder 50 through pipe 64, the chamber 53 defined by cylinder 50, piston 51 and head 67, is vented to the atmosphere through pipe 65, passageways in valve 62 and exhaust pipe line 68. Thus, compressed air in chamber 53 is released and escapes as piston 51 moves toward head 67.

As piston 51 moves from its limit position adjacent head 66 to its limit position adjacent head 67, rack 44 is advanced from its limit position remote from cylinder head 66 to its limit position adjacent cylinder head 66, that is toward the left as viewed in FIG. 2. Monorail section 24 concurrently swings about a vertical axis normal to its longitudinal dimension and hanger bracket 28 may thus be swung from a position adjacent hanger bracket 19, out of the drawing view toward the viewer and toward the left into the position in which it is shown in FIG. 2, and the direction of this movement is indicated by arrow R in FIG. 4.

Hanger bracket 29 is simultaneously swung from a position adjacent to hanger bracket 18, further into the view and to the right and then outwardly into the position shown in FIG. 2 adjacent hanger bracket 19, the direction of which movement is indicated by arrow $R_1$ in FIG. 4. The axis of rotation is the axis of stub shaft 43. The above described rotation would result from leftward movement of rack 44 into the position in which it is shown in FIG. 2, while the teeth thereof are in meshing engagement with the teeth of pinion 38. Since the movement of piston 51 has precisely established limits, cylinder 50 is secured in position relative to frame 15 so as to establish an indexing relation between monorail segment 24 and the adjacent monorail segments 16 and 17, such that for each limit position of piston 51 there is a corresponding end to end predetermined aligned relation between the several monorail segments shown.

When toggle switch lever 71 is thrown from the position in which it is shown in full lines in FIG. 2 to the dotted line position 72, valve 62 will be moved into its second position in which compressed air is supplied through pipe line 65 to chamber 53 while chamber 54 is vented to the atmosphere through pipe line 64, a passage in valve 62 and exhaust pipeline 68. Compressed air moving through pipe line 65 into chamber 55 will shift piston 51 to the right of the position in which it is shown in dotted lines in FIG. 2 into a corresponding limited position adjacent cylinder head 66. Such movement of piston 51 will be accompanied by movement of rack 44 from the position in which it is shown in FIG. 2 to an opposite limit position to the right thereof. Shifting of rack 44 in the latter fashion will rotate pinion 38 and the structure coupled thereto. As a result movement of monorail section 24 together with hanger brackets 28 and 29 in the direction indicated by arrows P and $P_1$ in FIG. 4 occurs. Such movement is opposite to that previously described. It is preferable that the forces applied through this mechanism are of large enough magnitude to produce rapid rotation of monorail section 24 and its associated supporting structure through 180° of arc.

It is customary to use monorail conveyors in packing houses to permit one worker to transport unit loads of the order of 500 to 1000 pounds, which loads while respectively suspended from trolley-like carriers running upon the monorail, may be pushed along by the worker. In the drawings one such form of trolley or carrier 80 is shown. The device comprises a pair of grooved wheels 81, 82, as shown in FIGS. 1, 2 and 3, respectively, journaled for rotation on axles 83 and 84, the ends of which are supported in inverted J-shaped frame members 85, 86. Upper tie frame bar 87 is secured by rivets 88, 89 to inverted J-members 85, 86, respectively. Lower frame tie bar 90 is secured by bolts 91, 92 and cooperating nuts 93, 94, to the lower portions of the J-shaped frame members. Hook 95 extends through an aperture provided in frame bar member 90 and has an enlarged shoulder portion 96 which rests upon the upper face of bar member 90. Hook 95 is free to rotate about its axis, and portion 96 thereof in cooperation with the upper face of frame bar 90, precludes movement of 95 downward through the aperture in member 90. Any suitable device such as a rack, frame, gambrel or the like, may be engaged upon hook 95 for support thereby. A device supported upon hook 95 may have attached to it one or more pieces of meat or other material processed in a packing house and which it is desired to transport along the monorail. One worker may push such unit load along while it is supported by grooved wheels 81, 82, rolling along the rail.

As shown most clearly in FIGS. 1, 2, and 3, the J-shaped frame portions 85, 86 depend adjacent the lateral faces 98, 99 of the monorail sections 17 and 24, for which reason the sections are customarily supported by hanger brackets such as 19 and 29, affixed to the corresponding side of each of the rail sections supported thereby. As shown in FIG. 4, a J-member represented schematically in section by the portion designated 86, will move past hanger brackets 19 and 29 without interference and advance in the direction of arrow A until it moves into position 861 in which it is in engagement with hanger bracket 28. Hanger bracket 28, and in its absence hanger bracket 18, would preclude further movement of member 86 in the direction of arrow A in FIG. 4. However, by rotation of monorail segment 24 through 180° of arc in the direction P, $P_1$, in the manner previously described, hanger bracket 28 will be displaced to the position occupied by hanger bracket 29 in FIG. 4 and the member 86 in position 861 will be shifted to the position 862. From the position 862, the frame member 86 may be freely moved in the direction indicated by arrow A along monorail segment 24 and the contiguous rail section 16. By mounting hook 95 for rotation relative to frame member 90, it is possible to so quickly rotate monorail section 24 and the trolley 80 resting thereon, that hook 95 coupled to a heavy load of meat or the like, will be rotated a negligible amount by reason of the fact of restraint of such movement by inertia of the load supported thereon. As shown, the spacing of hanger brackets 28 and 29 from the axis of rotation of monorail section 24 is such that the center of gravity of trolley 80 and the load supported from hook 95 thereof, is disposed between the axis of rotation and the hanger bar contacted by trolley 80 incident to impedance of further movement of the trolley. Centrifugal forces produced by the rapid swinging of monorail section 24 tend to throw the trolley device 80 more firmly against hanger bar 28, thus the device 80 remains on monorail section 24. When trolley 80 moves into abutting engagement with a hanger bar such as 28, the load suspended from hook 95 will usually tend to swing pendulously in the direction of movement "B," arrested by the hanger bar 28. The device illustrated and described is adapted to rotate monorail section 24 through 180° with great rapidity, the forward movement of the trolley in the direction of arrow B, FIG. 1, is almost without interruption when switch 69 is thrown nearly simultaneously with the making of physical contact between a portion of trolley 80 and the arresting hanger bracket 28.

When a second unit suspended beneath a second carrier, following carrier 80 along monorail 17, moves onto monorail section 24, its movement will be arrested by contact with hanger bar 29. Switch 69 may then be thrown to rotate rail section 24, 180° in the direction of arrows R, R₁ to permit advancement of the second carrier onto rail section 16.

Having thus described what presently appears to be a preferred embodiment of the invention, it will be apparent to those having ordinary skill in the art to which this invention pertains, that various modifications and changes may be made in the illustrative embodiment without departing from the spirit or the scope of the appended claims.

Therefore, what is claimed as new and is desired to be secured by Letters Patent is:

1. In a monorail conveyor, the combination comprising a frame having a first face and an oppositely facing second face, a stub shaft extending through said frame and supported for rotation therein, means secured to said shaft for angular swinging movement in unison therewith and adjacent said first face, power actuated means in cooperative relation to said means secured to said shaft for swinging said shaft through a predetermined angle, a double crank frame secured to said shaft for movement in unison therewith and supported adjacent said second face by said shaft, a pair of hangers secured to said double crank frame and extending away from said frame, a section of monorail being supported adjacent its ends by respective hangers of said pair of hangers, one of said hangers extending adjacent one side face of said monorail section and the second of said hangers extending adjacent the opposite side face of said monorail section, a power control for controlling said power actuated means, two monorail sections secured in fixed relation to said frame, each being aligned with said swingable monorail section in at least one of said limit positions and supported from the side corresponding to the side of said monorail section engaged by the nearest one of said hangers whereby conveyances moving along said monorail may be delivered to and from said rotatable monorail section and the fixed monorail section aligned therewith whereby a conveyance adapted to travel along said monorail conveyor may move from one of said fixed monorail sections onto said rotatable monorail section, be turned end for end and move from said rotatable monorail section onto said second fixed monorail section thereby eliminating back switching of said conveyance.

2. For inclusion in a monorail conveyor, a back-switching eliminator comprising in combination, a pair of spaced end aligned monorail sections fixedly hung with obstructing hangers on one side of one and on the opposite side of the other, a third monorail section supported for rotation about an axis of symmetry normal to the third monorail section, said third monorail section being adapted to bridge the gap between said fixedly hung sections and being hung on a pair of hangers each disposed adjacent a respective one of its ends and obstructing opposite sides corresponding to the obstructed side of the respective adjacent fixed monorail section.

3. For a monorail conveyor having a gap between two fixed spaced adjacent sections of monorail respectively hung by obstructing hangers on one side of one fixed section and upon the opposite side of the other, a side to side load supporting and shifting means for bridging said gap and comprising in combination rail support means rotatable about an axis and secured against axial shifting, a pair of hangers, a section of monorail secured adjacent its ends respectively to said hangers extending on opposite sides of said monorail, whereby said monorail is supported in spaced relation to said support means and in symmetric transverse relation to said axis of monorail support means rotation, and means for rotating as a unit said monorail support means, hangers and monorail section between two predetermined limit positions in each of which said monorail section is in end to end aligned relation to at least one adjacent fixed monorail section whereby means adapted to move along said monorail may move freely on said rotatably supported monorail section and one fixed monorail section aligned therewith severally and jointly.

4. A device in accordance with claim 3, characterized by the fact that said rail support means rotatable about an axis has a shaft portion journaled for rotation, a gear secured thereto and rotatable in unison therewith, and that said means for rotating comprises a rack having teeth meshing with teeth of said gear and means coupled to said rack for reciprocating same between predetermined limit positions corresponding to limit positions of the monorail rotation in unison with said gear.

5. In a conveyor comprising spaced first and second sections of monorail supported in end-to-end arrangement by means of hangers in supporting cooperation therewith and obstructing one side of the first monorail section and the opposite side of the second monorail section supported thereby while leaving the top edges and the side opposite that obstructed by the hangers free of obstructions and adapted for cooperatively supporting conveyances from which a load may be suspended beneath said rail and transported, a back-switching eliminator adapted to receive conveyances moving along the first monorail section and deliver said conveyances to the second monorail section having its unobstructed side in a position corresponding to the obstructed side of the first monorail section, said back-switching eliminator comprising in combination a frame, bearing means supported by said frame, a shaft journaled for rotational movement in said bearing means and extending through said frame, a double crank arm secured to said shaft beneath said frame and a gear secured to said shaft in adjacent relation to said frame, a pair of hangers each secured to a respective end of the double crank arm and extending away from said frame and spaced a distance greater than the length of a conveyance movable thereon, a section of monorail secured adjacent its ends respectively to said hangers, whereby each hanger obstructs a respective side of said section of monorail corresponding to the obstructed side of a monorail section adjacent the adjacent respective end thereof, whereby said gear, shaft, double crank arm, hangers and monorail section are joined together for rotational movement in unitary relation, a way supported by said frame adjacent said gear, a rack adapted to reciprocate on said way and having teeth engaging said gear, guide rolls supported relative to said frame and adapted to cooperate with said rack to retain the rack teeth in engagement with the gear, and means for moving said rack between predetermined limits whereby said gear may be rotated to index said monorail section rotatable therewith in predetermined positions of end-to-end tandem alignment with at least one adjacent monorail section.

6. A device in accordance with claim 5 characterized by the fact that said means for moving said rack between predetermined limits comprise a cylinder, a piston rod portion extending from said rack into said cylinder, a piston secured to said piston rod and movable within said cylinder, a two-position valve, means supplying compressed air to the inlet port of said valve, said valve being adapted to supply compressed air to either end of said cylinder while simultaneously venting the other end of said cylinder to the atmosphere whereby said piston may be advanced into a limit position remote from the end of the cylinder to which compressed air is supplied and means for controlling said valve to so supply compressed air to said cylinder as to shift said piston back and forth therein between limit positions whereby said rotatable monorail section may be shifted alternately between the two predetermined limit positions of tandem alignment with at least one adjacent monorail section.

7. For spanning a gap in a monorail conveyor, a rail turner comprising in combination a frame, a monorail section adapted to span said gap, means cooperating with and supported by said frame and cooperating with opposite sides of and supporting said monorail section adjacent respective ends thereof for rotation about an upright axis normal to said monorail section, mechanism for rotating said monorail section from a position of tandem alignment with said monorail conveyor to a second position of non-alignment and then to a position of tandem aligned relation to said conveyor.

8. For inclusion in a monorail conveyor along which load supporting conveyances are advanceable, a back switching eliminator comprising in combination a frame, a monorail section, means cooperating with said frame and supporting said monorail section for rotation about an axis normal to said monorail section at its center and lying in a vertical plane, said monorail section having stop means for arresting and indexing a conveyance in a position in which the center of gravity of the conveyance and load thereon is disposed between the stop means and the axis of monorail section rotation and mechanism for rotating said monorail section through a predetermined angle about said axis from one predetermined limit position to a second predetermined limit position.

References Cited in the file of this patent

UNITED STATES PATENTS

| | | |
|---|---|---|
| 386,871 | Ellis | July 31, 1888 |
| 589,724 | Hess | Sept. 7, 1897 |
| 908,031 | Palmros | Dec. 29, 1908 |
| 1,032,368 | Ballard | July 16, 1912 |
| 1,538,925 | Buckham | May 26, 1925 |
| 1,819,017 | Drake | Aug. 18, 1931 |
| 2,222,356 | Nelles | Nov. 19, 1940 |
| 2,341,162 | Salvador | Feb. 8, 1944 |
| 2,407,620 | Vinsant | Sept. 10, 1946 |

FOREIGN PATENTS

| | | |
|---|---|---|
| 435,739 | Germany | Oct. 16, 1926 |